May 31, 1960  A. F. PIEPER  2,938,757
GROOVED REFRACTORY PULLEY
Filed Jan. 2, 1959
Fig. 1
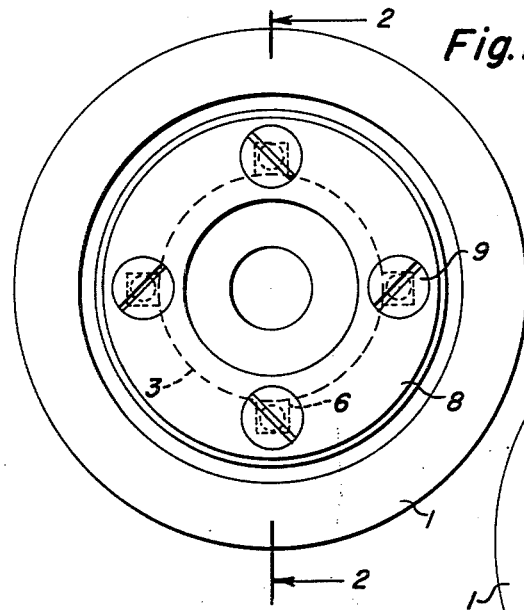
Fig. 3
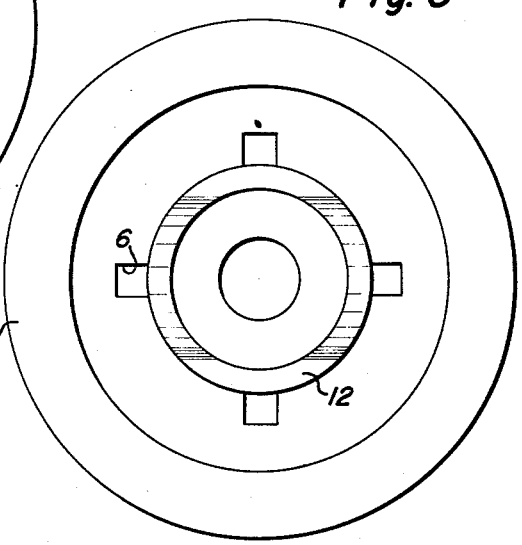
Fig. 2
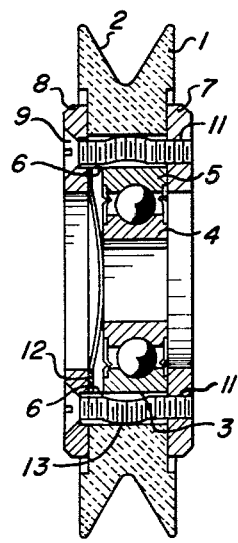
Fig. 5
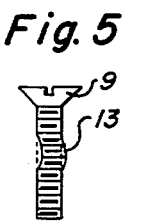
Fig. 4
ALPHONSE F. PIEPER
INVENTOR.
BY Harold E. Stonebraker
ATTORNEY

United States Patent Office 2,938,757
Patented May 31, 1960

2,938,757

GROOVED REFRACTORY PULLEY

Alphonse F. Pieper, 240 Sandringham Road, Rochester 10, N.Y.

Filed Jan. 2, 1959, Ser. No. 784,615

3 Claims. (Cl. 308—190)

This invention relates to a grooved refractory pulley with particular reference to pulleys made of porcelain or other brittle composition material which is baked for hardening and capable of withstanding excessive heat and offering great resistance to frictional wear resulting from strands or yarn passing over the grooved pulley, and it has for its purpose to provide a structure for mounting such a pulley on an anti-friction bearing so as to facilitate assembling or removing the pulley to enable substituting a new bearing when required.

A more particular purpose of the invention is to enable protecting a pulley against fracture or breakage when mounting it on an anti-friction bearing by sliding the bearing axially of the pulley.

Still an additional purpose of the invention is to provide supporting means for mounting a pulley on an anti-friction bearing such that the pulley can be quickly and easily secured in assembled relation on the bearing.

Another object of the invention is to provide a structure for securing a pulley on an anti-friction bearing in a manner that insures fastening the outer bearing-ring of an anti-friction bearing securely and rigidly to the pulley, all the parts of the fastening means being metallic and insuring a more durable and rigid attachment of the bearing-ring to the pulley than where rubber or some resilient spacing means is employed between the bearing-ring and the pulley.

Still an additional purpose of the invention is to provide a construction in which the pulley is mounted in such a manner that when assembled on the bearing, the initial concentric relationship of the pulley to the inner and outer bearing-rings will be permanently maintained, with no possibility of the pulley running out of true after it has been in continued operation for a time.

A further object of the invention is to afford a structure including bolts used to secure the anti-friction bearing in the pulley by means of fastening plates at the side faces of the pulley and bearing in such a way that the bolts are held firmly and locked in place against accidental displacement and without the necessity of employing lock nuts or other separate locking means, and thus facilitating the operation of assembling the fastening plates on the pulley or separating them for replacing a bearing.

To these and other ends, the invention consists in the construction and arrangement of parts that will appear clearly from the following description when read in conjunction with the accompanying drawings, the novel features being pointed out in the claims following the specification.

In the drawings:

Fig. 1 is a view in side elevation illustrating a pulley structure in accordance with a preferred embodiment of the invention when the parts are assembled;

Fig. 2 is a vertical sectional view on line 2—2 of Fig. 1 looking in the direction indicated;

Fig. 3 is a view in side elevation with the bolts and fastening plates removed, and illustrating the tempered spring steel washer in operative position on the bearing to receive its fastening plate;

Fig. 4 is a detailed perspective view of the spring steel washer, and

Fig. 5 is a detail view in elevation of one of the bolts.

Referring more particularly to the drawings in which like reference numerals refer to the same parts throughout the several views, the invention in its preferred embodiment includes a pulley 1 of refractory material such as porcelain, Bakelite, or other baked hard substance which is readily fractured if subjected to excessive pressure or a blow, the pulley being grooved at 2 and provided with a central opening 3 of cylindrical contour to receive inner and outer bearing-rings 4 and 5, constituting a conventional anti-friction bearing that is adapted to be mounted in the opening 3 of the pulley. The outer bearing-ring has a cylindrical surface that fits closely in the pulley and is removably positionable by movement axially of the pulley. The pulley is provided with transverse recesses or slots 6 adjacent to and surrounding the central opening 3, while 7 and 8 designate fastening plates overlying the recesses 6 and outer bearing-ring in the side faces of the pulley. The openings or slots 6 extend through the pulley between its opposite side faces adjacent to the inner central opening 3, and the fastening plates 7 and 8 are secured by means of bolts 9 having heads seated in recesses in the fastening plate 8, and extending through the openings or slots 6 in the pulley and having threaded ends 11 in engagement with the threaded openings in the fastening plate 7.

In order to secure the outer ring of the anti-friction bearing tightly and securely to the pulley, there is provided a tempered spring steel washer 12 located between and seated respectively against the fastening plate 8 and the adjacent side of the outer bearing ring. The washer 12 is bent or bowed transversely in opposite directions affording alternately arranged convex and concave portions which when pressure is applied by tightening the fastening plates 7 and 8, are flattened in the space between the fastening plate 8 and the side of the outer bearing-ring 5. Thus the tempered steel spring washer is compressed or flattened axially until the fastening plates are in contact with the pulley and the outer bearing-ring is maintained tightly against further movement in relation to the pulley. In this position the outer bearing-ring is spaced slightly from the fastening plate 8 and is maintained under the pressure of the spring washer against the pulley.

In order to lock the fastening plates and bolts in their secured positions axially of the pulley, the bolts are provided intermediate their ends with alternately arranged transversely crimped or bowed portions 13 approximately $10/1000''$ to $15/1000''$ in depth, and the parts are so designed that when the clamping plates are secured tightly against the pulley, the steel spring washer is held under tension against the adjacent side of the outer bearing-ring. As each bolt is turned tightly into the fastening plate 7, there is a slight distortion of the bolt as its bent portion tends to straighten. This locking effect exerted on the bolt during its slight final movement causes it to be gripped securedly by the fastening plate 7 and to be held tightly against accidental loosening, until it is desired to remove the pulley and replace the bearing, whereupon the parts can quickly be displaced by forcefully turning the bolts for loosening.

The clearance or space provided around each bolt between the bolt and the pulley slot is approximately $1/32''$, and the space or clearance provided between the outer bearing-ring 5 and the tempered steel spring washer when under compression is approximately $15/1000''$.

While the invention has been described with reference to the pulley and fastening means herein shown and described, it is not restricted to the particular construction disclosed, and this application is intended to cover such modifications or departures as may come within the purposes of the improvement or the scope of the following claims.

I claim:

1. The combination with a grooved pulley of refractory material having a central cylindrical opening which receives an anti-friction bearing on which the pulley is mounted, said bearing including inner and outer bearing-rings with anti-friction elements located therebetween, the outer bearing-ring having a cylindrical outer surface fitting closely within the opening in the pulley and removably positionable therein by movement axially of the pulley, retaining means securing the outer bearing-ring to the pulley, said retaining means comprising oppositely arranged fastening plates attached to the side faces of the pulley, bolts having heads seated in recesses in one of said fastening plates and threaded ends having engagement with threaded openings in the other fastening ring, said bolts having portions intermediate their ends crimped transversely and acting to lock the bolts to the fastening plates, and means interposed between the outer bearing-ring and one of the fastening plates acting to exert lateral pressure upon the outer bearing-ring and thereby to retain the outer bearing-ring against unintentional movement relatively to the pulley.

2. The combination with a grooved pulley of refractory material having a central cylindrical opening which receives an anti-friction bearing on which the pulley is mounted, said bearing including inner and outer bearing-rings and anti-friction elements located therebetween, the outer bearing-ring having a cylindrical outer surface fitting closely within the pulley and removably positionable therein by movement axially of the pulley, retaining means securing the anti-friction bearing to the pulley comprising fastening plates attached to the opposite side faces of the pulley and overlying the anti-friction bearing, bolts including heads positioned in recesses in one of the fastening plates and having threaded ends engaging threaded openings in the other fastening plate, the anti-friction bearing being of slightly less width than the body of the pulley and affording a space between the anti-friction bearing and the adjacent fastening plate, a yieldable spring washer seated between said fastening plate and the outer bearing-ring and having alternately arranged convex and concave portions engaging the outer bearing-ring and acting to retain the latter securely to the pulley and said bolts being transversely crimped at points intermediate their ends and acting to lock the bolts in the fastening plates.

3. The combination with a grooved pulley of refractory material having a central cylindrical opening which receives an antifriction bearing on which the pulley is mounted, said bearing including inner and outer bearing-rings with anti-friction elements located therebetween, the outer bearing-ring having a cylindrical outer surface fitting closely within the opening in the pulley and removably positionable therein by movement axially of the pulley, retaining means securing the outer bearing-ring to the pulley, said retaining means comprising oppositely arranged fastening plates attached to the side faces of the pulley, and bolts having heads seated in recesses in one of said fastening plates and threaded ends having engagement with threaded openings in the other fastening ring, said bolts having portions intermediate their ends crimped transversely and acting to lock the bolts to the fastening plates.

References Cited in the file of this patent

UNITED STATES PATENTS

| 2,018,221 | Mueller | Oct. 22, 1935 |
| 2,361,107 | Johnson | Oct. 24, 1944 |
| 2,415,924 | Wells | Feb. 18, 1947 |

FOREIGN PATENTS

| 108,937 | Great Britain | Aug. 30, 1917 |